(12) United States Patent
Misra et al.

(10) Patent No.: US 7,445,718 B2
(45) Date of Patent: Nov. 4, 2008

(54) REMOVAL OF ARSENIC FROM DRINKING AND PROCESS WATER

(75) Inventors: Manoranjan Misra, Reno, NV (US); Peter Lenz, Reno, NV (US)

(73) Assignees: The Board of Regents of the Nevada Systems of Higher Education on behalf of the University of Nevada, Reno, Reno, NV (US); EP Minerals, LLC, Reno, NV (US)

( * ) Notice: Subject to any disclaimer, the term of this patent is extended or adjusted under 35 U.S.C. 154(b) by 108 days.

(21) Appl. No.: 10/510,526

(22) PCT Filed: Apr. 10, 2003

(86) PCT No.: PCT/US03/11010

§ 371 (c)(1),
(2), (4) Date: Aug. 30, 2005

(87) PCT Pub. No.: WO03/086564

PCT Pub. Date: Oct. 23, 2003

(65) Prior Publication Data

US 2006/0086670 A1    Apr. 27, 2006

Related U.S. Application Data

(60) Provisional application No. 60/371,773, filed on Apr. 10, 2002.

(51) Int. Cl.
    *C02F 1/58* (2006.01)
(52) U.S. Cl. .................. 210/714; 210/667; 210/716; 210/723; 210/724; 210/738; 210/778; 210/911; 252/175; 252/179

(58) Field of Classification Search ................ 210/911
    See application file for complete search history.

(56) References Cited

U.S. PATENT DOCUMENTS

| 3,956,118 A | 5/1976 | Kleber et al. |
| 5,064,531 A | 11/1991 | Wang et al. |
| 5,432,077 A | 7/1995 | Farrah |
| 5,547,583 A | 8/1996 | Alexander |
| 5,603,838 A | 2/1997 | Misra et al. |

(Continued)

FOREIGN PATENT DOCUMENTS

| HU | 33749 T | * 12/1984 |
| JP | 2001340873 A | * 12/2001 |

OTHER PUBLICATIONS

D. Ahmann et al., "Microbial Mobilization of Arsenic from Sediments of the Aberjona Watershed," Environ. Sci. Technol. 31:2923-2930, 1997.

(Continued)

*Primary Examiner*—Peter A. Hruskoci
(74) *Attorney, Agent, or Firm*—Greenlee, Winner and Sullivan, P.C.

(57) ABSTRACT

A method of removing arsenic and heavy metals from water using metal salt hydroxidegels is provided. The arsenic present in water is adsorbed onto the hydroxide-gels which can effectively be filtered through a diatomaceous earth (DE) filtration bed. The combination of DE mixed hydroxide-gels is also effective in removing arsenic from water and heavy metals from water.

17 Claims, 9 Drawing Sheets

U.S. PATENT DOCUMENTS

| | | | |
|---|---|---|---|
| 5,683,953 | A | 11/1997 | Mills |
| 6,197,201 | B1 | 3/2001 | Misra et al. |
| 6,200,482 | B1 * | 3/2001 | Winchester et al. ......... 210/681 |
| 6,821,434 | B1 * | 11/2004 | Moore et al. ................ 210/667 |
| 7,247,242 | B1 * | 7/2007 | Moore et al. ................ 210/662 |

OTHER PUBLICATIONS

S. A. Davis and M. Misra, "Transport Model for the Adsorption of Oxyanions of Selenium (IV) and Arsenic (V) from Water Onto Lanthanum- and Aluminum-Based Oxides," Journal of Colloid & Interface Science 188:340-350, 1997.

EPA, Arsenic in Drinking Water [online], 2002 [retrieved on Jan. 3, 2005], Retrieved from the Internet: <url: http://www.epa.gov/safewater/arsenic.html>.

S. K. Gupta and K. Y. Chen, "Arsenic Removal by Adsorption," Journal of Water Pollution Control Federation 50(3):493-506, Mar. 1978.

T. R. Harper and N. W. Kingham, "Removal of Arsenic from Wastewater using Chemical Precipitation Methods," Water Environment Research 64(3):200-203, 1992.

D. T. Merrill et al., "Field Evaluation of Arsenic and Selenium Removal by Iron Coprecipitation," Environmental Progress 6(2):82-90, May 1987.

M. Misra et al., "Adsorption and Separation of Arsenic from Process Water Using LS™," Proceedings of the Randol Gold Forum 1997, pp. 203-206, 1997.

M. Misra and K. O. Adutwum, "Adsorption of Oxyanions of Selenium onto Lanthanum Oxide and Alumina," Minor Elements 2000, Published by SME, pp. 345-353, Feb. 2000.

M. Misra et al., "Enhanced Precipitation and Stabilization of Arsenic from Gold Cyanidation Process," Minor Elements 2000, Published by SME, pp. 141-148, Feb. 2000.

J. Nanor and M. Misra, "Removal and Stabilization of Arsenic," Randol Gold & Silver Forum, pp. 191-196, 1998.

A. Rawat and M. Misra, "Adsorption of the Oxyanions of Arsenic onto Lanthanum Oxide," EPD Congress, The Minerals, Metals and Materials Society (TMS), Warrendale, PA, pp. 13-23, 1998.

S. A. Wasay et al. "Removal of Arsenite and Arsenate Ions from Aqueous Solution by Basic Yttrium Carbonate," Wat. Res. 30(5):1143-1148, 1996.

* cited by examiner

REMOVAL OF ARSENIC FROM DRINKING AND PROCESS WATER

CROSS-REFERENCE TO RELATED APPLICATIONS

This application is the National Stage of International Application No. PCT/US2003/011010, filed Apr. 10, 2003, which takes priority from U.S. Provisional Application Ser. No. 60/371,773, filed Apr. 10, 2002, both of which are hereby incorporated by reference to the extent not inconsistent with the disclosure herewith.

BACKGROUND OF THE INVENTION

Arsenic is a naturally occurring element in the earth's crust and can be found in many natural ecosystems. Mining of ores containing arsenic releases arsenic into the soil. Burning of arsenic containing fossil fuels, volcanic eruptions and weathering processes also introduce substantial amounts of arsenic into the environment. Various industrial activities such as smelting, petroleum refining, pesticide and herbicide manufacturing, glass and ceramic production generate arsenic containing wastewater. The presence of arsenic in natural waters may originate from geochemical reactions, industrial waste discharges or agricultural use of pesticides containing arsenic (Gupta and Chen, 1978). Most of the gold and silver ores are closely associated with arsenic compounds. Arsenic is present in the gold cyanidation process. Arsenic is present in gold extraction processes, which utilize roasting, pressure autoclaving and other oxidation pathways.

The major issue in studies related to arsenic in the environment has involved its deleterious effects on the environment. Arsenic is mobile within the environment and may circulate many times in various forms through the atmosphere, water and soil before finally entering to sediments (Ahmann et al., 1997).

Hyperpigmentation, skin cancer, liver cancer, circulatory disorders, and other ailments have been attributed to the presence of arsenic in water (National Academy of Sciences, 1977; National Research Council, 1999). The United States Environmental Protection Agency (USEPA) has identified arsenic as a group A "known" carcinogen. This classification is based on sufficient evidence of carcinogenicity from human data involving occupational and drinking water exposures. Arsenic presents a potential health problem due to its toxicity. In response to these health concerns, the USEPA, in January 2001, promulgated the new Arsenic rule that lowered the maximum contaminant level (MCL) in drinking water to 10 μg/L (10 ppb) for both community and non-transient, non-community water systems. Previously, the Safe Drinking Water Act (SDWA) had a minimum standard of 50 ppb. USEPA lowered the standard based on recommendations by the National Research Council (1999) which reviewed scientific studies on health effects of arsenic on human populations. At present, approximately 4000 drinking water systems in the U.S. will need to comply with the new standard by January 2006, and many of these systems are located in rural areas of the West. Conventional water treatment systems will cost the nation between $180 and $725 million to meet the 10 ppb standard set by EPA.

Arsenic occurs in inorganic form in aquatic environments, resulting from the dissolution of solid phases such as arsenolite ($As_2O_3$), arsenic anhydride ($As_2O_5$) and realgar ($AsS_2$). The chemistry of arsenic in aquatic systems is complex because the element can be stable in four major oxidation states (+5, +3, 0 and −3) under different redox conditions. In natural waters arsenic is found as an anion with acid characteristics in only the As(III) and As(V) oxidation states. In oxygenated waters, the oxyanions of arsenic exist in four different arsenate species as $H_3AsO_4$, $H_2AsO_4^-$, $H_3AsO_4^{2-}$ and $AsO_4^{3-}$ in the pH ranges of <2, 3-6, 8-10 and >12, respectively. Arsenite is more likely to be found in oxygen free (anaerobic) groundwater, while arsenate is more common in aerobic surface water. Arsenite ion is oxidized to arsenate in the presence of oxygen, chlorine or potassium permanganate. Therefore under neutral conditions and acidic conditions, As(III) exists as a neutral species and cannot be adsorbed by an adsorbent based on ionic interaction alone. The chemistry of arsenic is more fully described in U.S. Pat. No. 6,197,201.

Several methods for reducing arsenic concentrations to acceptable levels have been studied and are being used currently. These methods include coagulation and precipitation using ferric chloride and sulfate, ion exchange, reverse osmosis and adsorption using activated carbon and alumina. These methods are effective to a certain extent. However, these methods are considerably more expensive and generally narrower in application than is desired for the treatment of large volumes of water.

The use of ferric chloride, hydrated lime, sodium sulfate and alum to coagulate water containing arsenic has been described (Harper and Kingham, 1992). These methods require multiple treatments of water with coagulation chemicals and large amounts of chemicals relative to the amount of arsenic present to obtain the desired reduction in arsenic concentration. In addition, the methods produce sludge that requires dewatering or solidification and eventually landfill storage as hazardous waste. Also, the ferric chloride process requires pH of less than 6.5 (Merrill et al., 1987).

A method of precipitating arsenite and arsenate ions from aqueous solutions using yttrium carbonate at alkaline pH has also been described (Wasay et al., 1996). This method requires strict control of pH to achieve removal sufficient to comply with environmental standards. In addition, the effective pH range was found to depend on which arsenic species was desired to be precipitated.

U.S. Pat. No. 3,956,118 discloses a process for removing phosphate ions from waste waters using a rare earth salt. However, the disclosed process is limited to removal of phosphates.

Recently new adsorbents, lanthanum oxide and lanthanum-alumina oxide, have been used for removing arsenate and arsenite species from solution (U.S. Pat. No. 5,603,838, 1995). This patent discloses that lanthanum oxide alone or in conjunction with alumina solids and other oxides can remove arsenic to low levels (<50 ppb). Also, the adsorption kinetics were found to be extremely fast compared to other adsorbents such as alumina (Davis and Misra, 1997; Misra and Adutwum, 2000; Misra et al., 1997; Rawat and Misra, 1998).

A novel precipitation process developed by Misra et al. (U.S. Pat. No. 6,197,201) uses lanthanum chloride and optionally other salts to selectively coprecipitate arsenite and arsenate from process water (Misra et al., 2000; Nanor, Misra, and Chen, 1999; Nanor and Misra, 1998).

General drawbacks of the processes discussed above include inefficient removal of arsenic to an acceptably low level for drinking water and discharge into ground water, the problem of filtration of precipitated sludge and fouling of resins and membranes. In addition, once the arsenic species are removed, the solid materials formed must be disposed of. The solid materials formed from the processes above are also susceptible to leaching of the metals at a future time.

There is a need for a highly selective and inexpensive reagent, which effectively precipitates and stabilizes arsenate and arsenite species over a wide pH range from solutions or solids/liquid mixtures. There is also a need for an inexpensive, suitable media for the filtration of adsorbed arsenic species.

BRIEF SUMMARY OF THE INVENTION

This invention is in the field of removal of toxic metals from aqueous solutions and stabilizing toxic metals, specifically removal of arsenic and heavy metals from aqueous solutions and drinking water.

It was discovered that lanthanum hydroxide is a powerful reagent to precipitate heavy metals and arsenic as arsenite and arsenate ions, for example, from aqueous solution at various pHs. The lanthanum hydroxide can be pure or can be mixed with other elements of the lanthanide series. Lanthanum hydroxide can also be used in combination with other metals such as ferric hydroxide, magnesium hydroxide, sodium hydroxide and/or aluminum hydroxide. Lanthanum hydroxide optionally combined with other metal hydroxides are referred to as "metal salt hydroxide-gels". A preferred embodiment is the combination of iron chloride and lanthanum chloride at various ratios which form mixed metal salt hydroxide-gels at an appropriate pH which are used to remove arsenic from water, as described herein. When a small amount of lanthanum chloride is added to solutions containing arsenite and arsenate in the presence of ferric ions, the ions substantially precipitate from the solution. The resultant precipitant is extremely stable and easy to filter. The precipitant may be filtered through a bed of diatomaceous earth (DE filter bed or DE bed), for example. Alternatively, a pre-coat DE bed may be used, where the DE is coated on a filter screen or septum and the arsenic-containing solution is passed through the pre-coat DE bed. The filter screen or septum is a water-compatible material. Some examples of water-compatible materials are polyethylene, polypropylene or stainless steel, or other suitable material as known to one of ordinary skill in the art. DE coated with metal salt hydroxide-gels can be used to coagulate arsenic which can further be filtered through a second DE bed or pre-coat DE bed, if necessary, to reduce the concentration of arsenic to a desired level. Generally, the DE filter bed is made by filtering water conditioned with DE through a screen. The thickness of the DE bed ranges from ½ inch to several inches thick, as known by one of ordinary skill in the art.

The metal salt hydroxide-gels can be formed prior to contacting with water to be treated by combining non-hydroxide metal salts at an appropriate pH, forming metal salt hydroxide-gels. These metal salt hydroxide-gels are then contacted with the water to be treated. Alternatively, the metal salt hydroxide-gels can be formed upon contacting the water to be treated with the metal salts, by suitable pH adjustment.

Specifically, provided is a method of removing arsenic from arsenic-containing water comprising: contacting said water with a precipitating composition comprising a metal salt hydroxide-gel; and separating said water from said precipitating composition. Preferably said separating is carried out using a filter. The filter is preferably a DE filter bed or a pre-coat DE filter bed.

Also provided is a method of removing arsenic from arsenic-containing water comprising: coating DE with one or more metal salt hydroxide-gels to form DE pre-coated hydroxide-gels; and contacting said arsenic-containing water with said DE pre-coated hydroxide-gels.

Also provided are materials comprising diatomaceous earth coated with metal salt hydroxide-gels. These materials are made by mixing metal salts with DE. The hydroxides can be formed by pH adjustment upon mixing or the materials can be stored and the pH adjusted to form hydroxides when desired. These materials are further described in Examples I through L.

Also provided are methods of removing heavy metals from heavy metal-containing solutions. The same methods, metal salt hydroxide-gels, and filters described herein for removing arsenic are used to remove heavy metals. Preferred heavy metals include copper, lead and chromium.

Preferably, the metal salt hydroxide-gel is formed from one or more members of the group consisting of: lanthanum chloride, lanthanum nitrate, lanthanum carbonate, other rare earth salts, ferric chloride, ferric sulfate, magnesium chloride, magnesium nitrate, magnesium carbonate, aluminum chloride, aluminum nitrate, aluminum sulfate, and sodium aluminate. Other salts may be used, as known in the art. Hydroxide salts, such as $La(OH)_3$ may also be used to form the metal salt hydroxide-gel, without precipitating from another metal salt, such as chloride.

The methods of the invention are carried out at a pH which is sufficient to allow the desired reactions to occur, preferably between about 2 to about 14, more preferably between about 4 to about 10. The metal salt hydroxide-gel is contacted with the arsenic- or heavy metal-containing water for a suitable time to allow the desired level of reduction to occur, typically between about 1 minute to about 30 minutes. The pH and time required to allow the desired level of arsenic reduction to occur is easily determined by the methods described herein. The methods of the invention remove arsenic from arsenic-containing water having a variety of concentrations of arsenic, preferably about 10 ppb to several ppm. The arsenic-containing water may contain one or more species of arsenic, such as arsenite and arsenate. The methods of the invention may be used to treat any water, including raw water, well water, drinking water (chlorinated or not), and process water. The methods of the invention remove heavy metals from heavy metal-containing water having a variety of concentrations of heavy metals, preferably from about 10 ppb to several ppm.

Preferably, the metal salt hydroxide-gel comprises lanthanum and iron, preferably at weight ratios of between about 1:1 and 1:10 and all intermediate values and ranges therein.

In the methods of the invention, the filter is preferably selected from the group consisting of: diatomaceous earth (DE), cellulose, and perlite, but any suitable material may be used, as known in the art. The arsenic-containing water is contacted with the metal salt hydroxide-gel by any means known in the art, including mechanical mixing, ultrasonic mixing, mixing in-line using an atomizer, mixing in-line using venturi and using metering pumps. The methods of the invention may further comprise separating the arsenic-removed water from the arsenic-containing hydroxide-gels. This separating may be accomplished by any means known in the art, including settling, DE-assisted settling, flotation of hydroxide-gels or DE-assisted centrifuge. The arsenic-containing sludge, consisting of hydroxide-gel and DE, is stable. The arsenic-containing sludge prepared by the methods described herein passes the Toxicity Characteristics Leaching Procedure (TCLP) test.

DETAILED DESCRIPTION OF THE INVENTION

Figure 1:
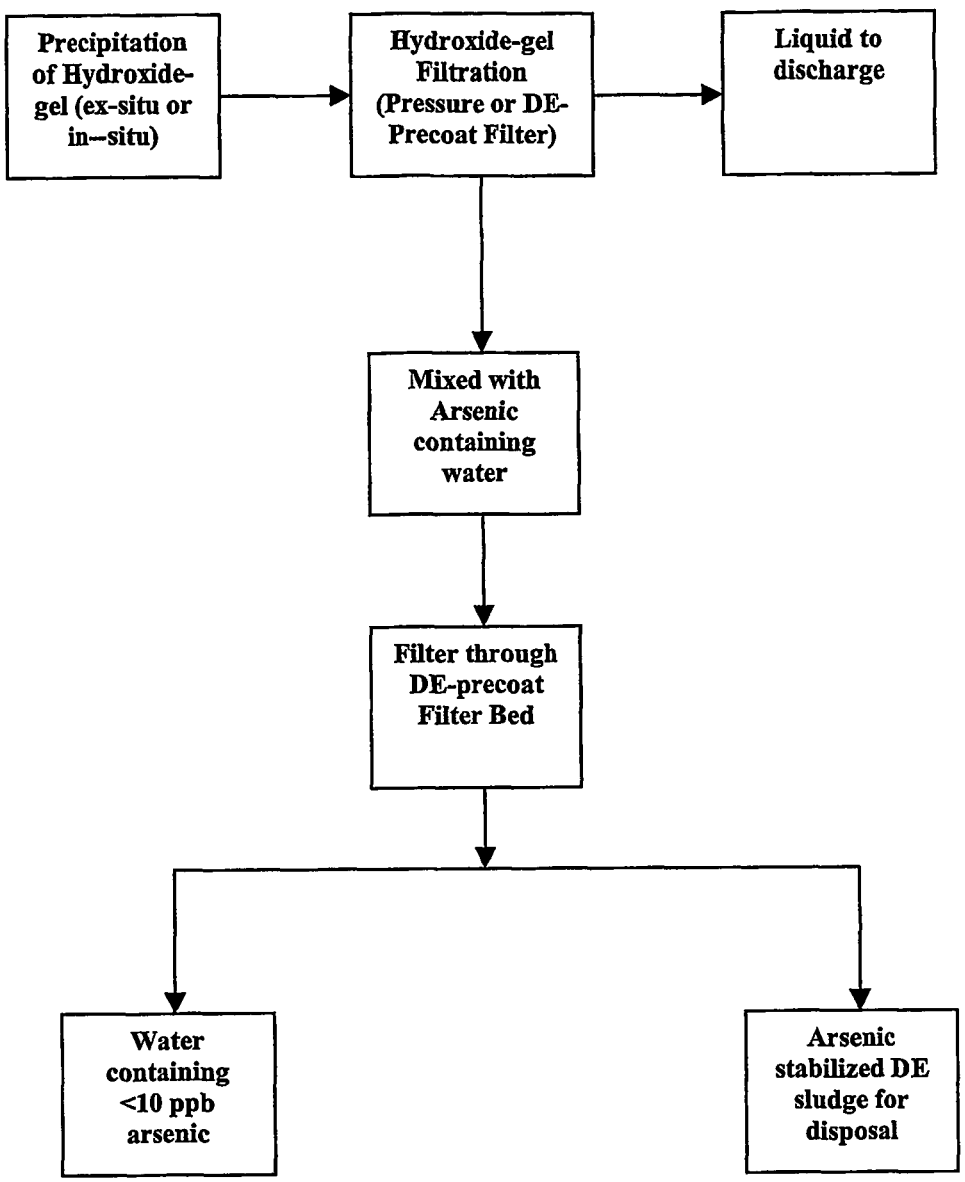
FIG. 1 shows a schematic of one embodiment of the invention.

As used herein, "removing" means the concentration is reduced to a desired level. For example, "removing arsenic from arsenic-containing water" means reducing the concentration of arsenic, preferably in the form of arsenite and arsenate, in arsenic-containing water to a desired level, preferably to a concentration below 10 ppb. "Arsenic-containing water" may contain other elements other than arsenic. "Aqueous solution" refers to a solution in which water is the dissolving medium or solvent A "precipitating composition" refers to any of the agents described herein that cause precipitation or stabilization of the ions of interest. Preferred precipitating compositions are metal salt hydroxide-gels. A "solid" material refers to the resultant material formed from the contacting of the precipitating composition with the aqueous solution. Solid materials formed include amorphous materials and crystalline materials or mixtures. The pH of the aqueous solution is adjusted by any means known by one skilled in the art, including addition of calcium hydroxide and sodium hydroxide to raise the pH or acid to lower the pH. A "concentration effective for removing at least one ion" refers to the concentration of precipitating composition required to remove a measurable amount of the selected ion. "Lanthanum chloride" refers to both pure and impure lanthanum chloride. Impure lanthanum chloride can contain various elements of the lanthanide series in addition to lanthanum. The lanthanide series of elements includes the elements lanthanum, cerium, praseodymium, neodymium, etc, as known in the art. Ferric hydroxides can be prepared from ferric chloride, ferric sulfate, and ferric nitrate, as known in the art. Other metal hydroxides can be prepared from other metal salts by mixing with lime, caustic, and magnesium oxide, as known in the art. As used herein, "contacting" means the arsenic- or heavy metal-containing water and the precipitating composition are placed together so that the desired reaction occurs to the desired extent. As used herein, a "metal salt hydroxide-gel" is a hydroxide formed from a metal salt, which can be used in the methods of the invention to remove arsenic from arsenic-containing water or heavy metals from heavy metal-containing water.

The processes of this invention can achieve the removal of more than 99% of arsenic species in an aqueous solution. Concentrations of less than 5 parts per billion arsenic are achievable. The processes of this invention can achieve the removal of more than 99% of at least one heavy metal species in an aqueous solution. Concentrations of less than 5 parts per billion heavy metal are achievable.

In the methods of the invention, solutions containing arsenic ions are contacted with a precipitating composition. For the removal or stabilization of arsenic ions, such precipitating compositions comprise from about 10-5000 moles of lanthanum or other elements of the lanthanide series for every mole of arsenic ions in solution. The compositions can comprise ferric ions in concentrations from about 1 mole to about 500 moles ferric ions or other metal other than lanthanide or other elements of the lanthanide series for every mole of arsenic ion. The same concentrations are useful to remove heavy metals from solution.

The solution should remain in contact with the precipitating composition for a period of time sufficient to cause removal of arsenic ions to the desired concentration ranges. Typically about 5-30 minutes is sufficient to cause precipitation to the desired concentration range and/or stabilization of the arsenic when the concentration of arsenic in solution is between 12-100,000 ppb.

The process of this invention can be used to remove arsenic from solutions that contain one or more species of arsenic.

A preferred process of this invention involves adjusting the pH of the solution to between 6 and about 10, adding 1000 moles of lanthanum for every mole of arsenic ions present in solution, and adding about 5 to about 6 moles of ferric ions for every mole of arsenic ions present in solution. The arsenic is stabilized by the metal salt hydroxide-gels formed. The solution is then typically separated from the solids, preferably through a filter.

Suitable precipitating composition levels depend on the desired level of arsenic or heavy-metal removal. Generally, a level of between 10 mg precipitating composition per liter to be treated and 1000 mg/L are useful, and all individual values and ranges therein.

DE filter aids are generally used in two different modes: as a precoat, wherein the DE acts as the solid/liquid separation surface barrier (albeit with some depth), and as body feed, wherein the DE acts to maintain a permeable cake structure and create a de-facto depth filtration. These two modes are used both in combination and individually, depending on the type and degree of difficulty of the filtration.

For precoat applications, the DE must be able to form a barrier tight enough to provide the desired clarity of filtrate, while at the same time be as open as possible to provide maximum filtrate throughput. When used as a body feed or ad-mix, the filter aid must be just tight enough to prevent migration of trapped solids through the forming cake. These aspects of filtering are known to one of ordinary skill in the art.

The DE precoat is formed by passing a dilute suspension (generally less than 5% by weight) of DE in process water over a septum or screen. The septum or screen serves as a support structure for the formation of the DE precoat. As the slurry passes through the septum or screen, the DE solids are trapped on its surface and a precoat is formed. The precoat thickness can be as little as 1.5 mm and still provide adequate solid/liquid separation during subsequent filtration. The driving force during formation of the precoat can be either negative (vacuum) or positive pressure. The openings in the septum or screen should be just small enough to trap the DE particles, but can be highly variable in size and geometry. The septum or screen can be constructed of any materials compatible with water, including stainless steel, polypropylene, polyethylene, and other materials known in the art.

The invention is further illustrated by the following non-limiting examples.

In the examples below, bulk synthetic solutions were prepared for arsenic. All bulk solutions were made using deionized water. The lanthanum chloride used can be pure lanthanum chloride or lanthanum carbonate treated with hydrochloric acid. Ferric chloride can be obtained from a variety of commercial sources. The schematic of a preferred embodiment is given in FIG. 1.

EXAMPLE A

Removal of Arsenic from Synthetic Solutions

Arsenic removal from synthetic solutions was conducted using different precipitating chemicals. Initial arsenic concentration in the solution was maintained at 100 ppb, and pH was adjusted to 6-8.5 using lime and/or sodium hydroxide. After the addition of regent, the mixture was conditioned for 10 minutes. It was filtered through a previously prepared 2" thick filter bed made by DE. The DE filter bed was made by filtering 4 gms of DE conditioned in 500 cc of water in a 4" diameter filter crucible. A coarse filter paper was used to form the filter bed using a vacuum filter. The solution was filtered using a vacuum filtration system.

Results obtained with the direct addition of different precipitating agents are given in Table 1.

TABLE 1

Arsenic Removal from Synthetic Arsenic Solution

| Reagent, Addition, gm | pH | Initial As, ppb | Final As, ppb | % Removed |
|---|---|---|---|---|
| .25 gm $LaCl_3$ | 8.5 | 100 | 26 | 74 |
| .25 gm $FeCl_3$ | 8.18 | 100 | 11 | 89 |
| .25 gm $AlCl_3$ | 8.69 | 100 | 12 | 88 |
| .25 gm $La_2(CO_3)_2$ | 8.8 | 100 | 15 | 85 |
| .25 gm $La(NO_3)_3$ | 7.81 | 100 | 57 | 43 |
| .25 gm $Fe_2(SO_4)_2$ | 7.8 | 100 | 55 | 45 |
| .25 gm $MgCl_2$ | 9.11 | 100 | 42 | 58 |
| .25 gm $BaCl_2$ | 8.84 | 100 | 52 | 48 |

Results showed that arsenic can be removed by addition of chemical agents. Removal efficiencies are between 43%-89%.

EXAMPLE B

Arsenic Removal with Precipitated Mixed Hydroxides Followed by DE-Precoat Filtration Precipitated Ferric Hydroxide 0.25 gm $FeCl_3$ was dissolved in 100 cc of water. Ferric hydroxide was precipitated at pH 7.53 using lime. Different amounts of wet hydroxides were added to a 500 cc synthetic solution of arsenic. After 10 minutes conditioning time, the solution was filtered using a DE pre-coat filter. Results are given in Table 2.

TABLE 2

As Removal with Precipitated Ferric Hydroxide

| Amount Added, gm | pH | Initial As, ppb | Final As, ppb |
|---|---|---|---|
| 1 | 8.24 | 100 | 6 |
| .5 | 7.86 | 100 | 24 |
| .25 | 8.11 | 100 | 35 |

As can be seen, 1 gm of precipitated ferric hydroxide can reduce the As level below 10 ppb.

Precipitated Lanthanum Hydroxide

Lanthanum hydroxide was prepared from lanthanum chloride and/or lanthanum nitrate by adding lime at pH 10.0. 0.5 grams of lanthanum salts were dissolved in 100 cc of water. Precipitate was collected after filtration. One gram of wet precipitate was added to 500 cc of arsenic containing solutions. Results are shown in Table 3.

TABLE 3

Removal of Arsenic from Synthetic Solution using Lanthanum Hydroxide

| Amount Precipitated, gm | pH | Initial As, ppb | Final As, ppb |
|---|---|---|---|
| 1 | 7.49 | 100 | 15 |
| 1 | 8.12 | 100 | 32 |

Results showed that lanthanum hydroxide is capable of removing arsenic from synthetic solution.

Mixed Precipitated Hydroxides of Iron and Lanthanum for As Removal

Mixed hydroxides of iron and lanthanum were prepared by mixing $FeCl_3$ and $LaCl_3$ (prepared from lanthanum carbonate) by adding lime at pH ranges of 8-9. Mixed precipitate was prepared at three different weight ratios of Fe to La. Different amounts of precipitate were added to a synthetic solution containing 100 ppb of arsenic and mixed for 10 minutes. Results are shown in Table 4.

TABLE 4

Effect of Mixed Hydroxides on As Removal from Synthetic Solution

| Schedule Type | Amount of Precipitate Added, gm | Initial As, ppb | Final As, ppb |
|---|---|---|---|
| A (1:1) | 1 | 100 | 7 |
|  | .5 | 100 | 57 |
|  | .25 | 100 | 74 |
| B (2:1) | 0.5 | 100 | 25 |
|  | 0.25 | 100 | 45 |
| C (1:4) | 0.5 | 100 | 29 |
|  | 0.25 | 100 | 25 |

Schedule A: Fe:La Weight Ratio 1:1 Prepared by mixing 0.25 gm $FeCl_3$ plus 0.25 gm $La_2(CO_3)_3$ in HCl and then pH raised to 8.84 with lime
Schedule B: Fe:La Weight Ratio 2:1 Prepared by mixing 0.25 gm $FeCl_3$ and 0.125 gm $La_2(CO_3)_3$ in HCl and then pH raised to 8.2 with lime
Schedule C: Fe:La Weight Ratio 1:4 Prepared by mixing 0.25 gm $FeCl_3$ and 0.625 gm $La_2(CO_3)_3$ in HCl and then pH raised to 8.6 with lime Mixed hydroxide-gels of iron and lanthanum are effective to remove arsenic. Different ratios of ferric and lanthanum can be mixed to remove different amounts of arsenic. At a ratio of 1:1, 1 gm of mixed precipitate can effectively decrease arsenic from 100 ppb to 7 ppb.

EXAMPLE C

Enhanced Coagulation of Arsenic from Fernley Drinking Water with Precipitate Hydroxide-gel Followed by DE Pre-coat Filtration In these tests, drinking water obtained from a well in Fernley, Nev. was tested. The direct addition of chemical coagulant for arsenic has several disadvantages. They are:

(1) needs longer conditioning to precipitate and coagulate arsenic;
(2) anions such as chlorides, sulfate or nitrates are released to drinking water which need to be removed;
(3) bonding of arsenate is not strong;
(4) pH control is required to coagulate arsenate and arsenite ions;
(5) excessive reagent demand;
(6) size of a coagulant is small during direct addition; As a result, incomplete removal of arsenic may occur during separation.

In order to avoid the above mentioned problems and increase the arsenic removal efficiency, a novel precipitated hydroxide-gel coagulant process has been developed. This process is uniquely suitable for inexpensive pre-coat filtration using DE material. Results obtained with lanthanum hydroxides in combination with other hydroxides are given below in Tables 5-7.

Tests with Pure Lanthanum Hydroxide

Five grams of lanthanum carbonate was dissolved in hydrochloric acid at pH 1.0. Lanthanum hydroxide was precipitated at pH 10.0 using lime. Precipitate was filtered. Total weight of hydroxide was 5 grams (on wet basis). 1.25 gms of precipitate was added to Fernley drinking water. The pH was 8.70. After different conditioning times, the water was filtered through a DE pre-coat filter. Results are given in Table 5.

TABLE 5

Arsenic Removal from Fernley Drinking Water

| Time, min. | Initial As, ppb | Final As, ppb |
|---|---|---|
| 5 | 68 | 6 |
| 10 | 68 | 2 |
| 240 | 68 | Non-detectable |

As can be seen, direct addition of precipitated lanthanum hydroxide is capable of reducing the arsenic level in Fernley drinking water to less than 10 ppb in 5 minutes. After 10 minutes the arsenic level was 2 ppb.

Test with Precipitated Ferric Hydroxide 0.25 gms of $FeCl_3.7H_2O$ was dissolved in 100 cc water. Ferric hydroxide was precipitated at pH 7.5 using lime. Total weight of precipitate was 2 grams on weight basis. One gram of wet precipitate was added to 500 cc of Fernley drinking water. The pH of the solution was 8.03. After the specified conditioning time, the solution was filtered using DE pre-coat filtration. Results are given in Table 6.

TABLE 6

As Removal from Fernley Drinking Water with Ferric Hydroxide

| Time, min. | Initial As, ppb | Final As, ppb |
|---|---|---|
| 5 | 68 | 15 |
| 10 | 68 | 6 |
| 240 | 68 | 5 |

As can be seen, precipitated ferric hydroxide is capable of removing arsenic from drinking water. After 10 minutes, the concentration of As was below 10 ppb.

Test with Precipitated Lanthanum Hydroxide Plus Ferric Hydroxide

In another experiment, reduced amounts of ferric chloride and lanthanum chloride were used for precipitation. In this experiment, 0.25 gm $FeCl_3.7H_2O$ and 0.25 gm of $LaCl_3$ (prepared from $LaCO_3$) were mixed in 100 cc of water. The pH was increased to 8.80 using lime. The mixed precipitate was filtered. The total weight of precipitate was 5 grams. 2.5 grams of weight precipitate was added to the Fernley drinking water at a pH of 8.01. After conditioning for a specified time, the solution was filtered using DE pre-coat filtration. Results are given in Table 7.

TABLE 7

Arsenic Removal with Mixed Precipitated Hydroxides

| Time, min. | Initial As, ppb | Final As, ppb |
|---|---|---|
| 5 | 68 | 18 |
| 10 | 68 | 7 |
| 240 | 68 | 5 |

Precipitated mixed hydroxide-gels of iron and lanthanum can reduce the arsenic level below 10 ppb at a lower concentration.

Effect of Mixed Hydroxide Dosage on Arsenic Removal

As described in Table 7, the mixed hydroxide precipitate was prepared by mixing an equal weight of $FeCl_3.7H_2O$ and $LaCl_3$. In another series of experiments, mixed hydroxides were prepared by using different iron-to-hydroxide ratios. Different amounts of mixed hydroxides were added to Fernley drinking water. After mixing for a specified time, the water was filtered using a DE pre-coat filter. Results are given in Tables 8-10.

TABLE 8

Tests with Ferric Hydroxide (prepared by precipitating 0.25 gm $FeCl_3$ with lime at pH of 7.5); total precipitate = 2.0 grams (wet); conditioning time = 10 minutes

| Amount of Ferric Hydroxide Gram/500 cc | Initial As, ppb | Final As, ppb |
|---|---|---|
| 1 | 67 | 6 |
| 0.5 | 67 | 24 |
| 0.25 | 67 | 38 |

The above results showed that a preferred ferric hydroxide concentration is 1 gm/liter (equivalent to 0.12 gm $FeCl_3$). Below that concentration it is difficult to reduce As from Fernley water below 10 ppb.

Effect of Direct Addition of Ferric Chloride and Ferric Sulphate

In another series of experiments, chemical grade ferric chloride and ferric sulfate were directly added to Fernley drinking water. The pH of the water was increased to 8.2 with lime and it was mixed for 30 minutes. After 30 minutes of mixing, the water was filtered through the previously prepared DE-bed.

TABLE 9

Tests with $FeCl_3$ (alone) and $FeSO_4$ direct addition; Fernley water 500 cc

| Salt, gms | Initial As Concentration, ppb | Final As Concentration, ppb |
|---|---|---|
| $FeCl_3$ (.25 gm) | 67 | 11 (5 min) |
| $FeCl_3$ (.25 gm) | 67 | <10 (10 min) |
| $FeSO_4$ (.25 gm) | 67 | 21 (5 min) |
| $FeSO_4$ (.25 gm) | 67 | <10 (10 min) |

These tests show that $FeCl_3$ or $FeSO_4$ direct addition can decrease As concentration below 10 ppb. However, a higher amount of ferric chloride is needed as compared to hydroxides. Further, longer mixing time and pH adjustment is required. The disadvantage of the direct addition is that the chloride and sulfate ions present in water have to be removed.

TABLE 10

Tests with Combined Ferric Hydroxide plus Lanthanum Hydroxide
Prepared by mixing 0.25 gm $La_2(CO_3)_3$ plus
0.25 gm $FeCl_3$; Total hydroxide = 5 gms (wet basis)

| Amount of ppt, gm | Initial As Concentration, ppb | Final As Concentration, ppb |
|---|---|---|
| 1 | 67 | 7 |
| .5 | 67 | 57 |
| .25 | 67-68 | 67-68 |

As can be seen, 1 gm of combined hydroxide-gel precipitate can decrease As concentration below 10 ppb.

TABLE 11

Tests with Combined Lanthanum Hydroxide and Ferric Hydroxide
at Lower Concentration; (.125 gm $La_2(CO_3)_3$ plus 0.25 gm $FeCl_3$;
total ppt = 1.6 gm)

| Amount of ppt, gm | Initial As Concentration, ppb | Final As Concentration, ppb |
|---|---|---|
| .5 | 67 | 29 (5 min) |
| .5 | 67 | 10 (10 min) |
| .25 | 67 | 25 (5 min) |
| .25 | 67 | 23 (10 min) |

These results show that small additions of $La(OH)_3$ will decrease $FeCl_3$ addition to achieve 10 ppb.

EXAMPLE D

Scale-up Test Using Mixed Hydroxides

A series of experiments were conducted using five gallons of Fernley drinking water, in this case, hydroxide-gels prepared by mixing lanthanum chloride and ferric chloride in a ratio of 1:4. In one case, precipitation of hydroxides was conducted using chemical grade lime and in another case, chemical grade MgO was used.

Figure 2:
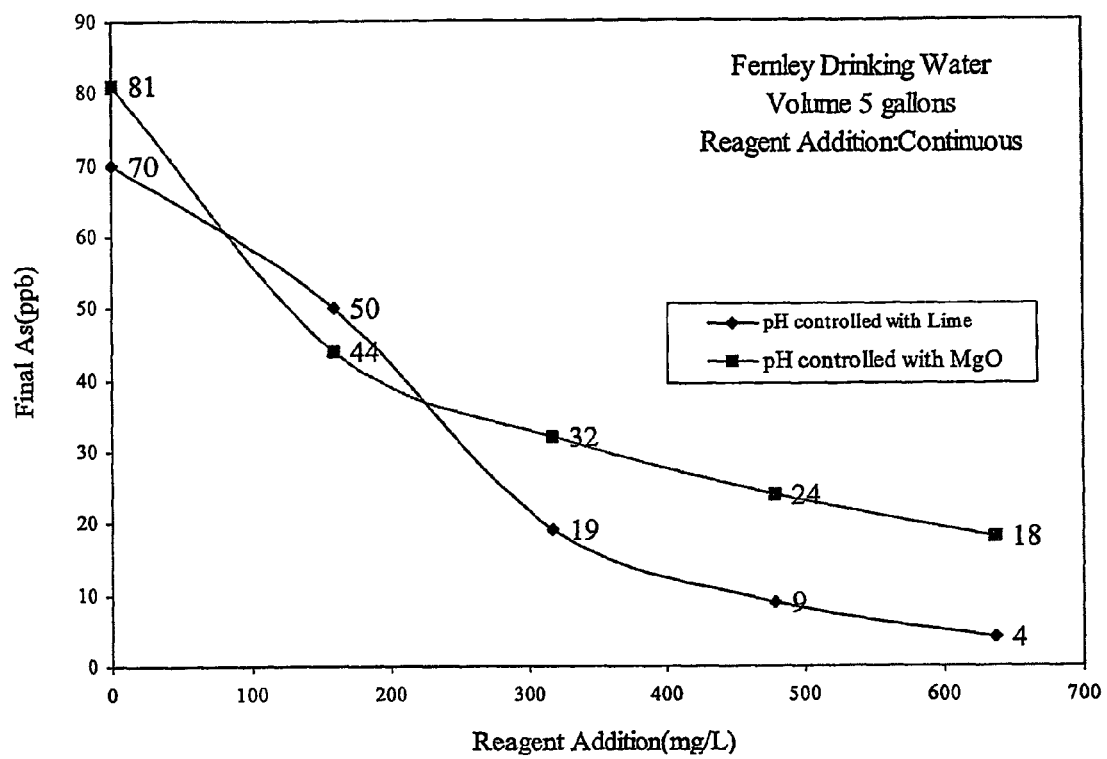
FIG. 2 shows arsenic removal as a function of hydroxide-gel addition.
Figure 3:
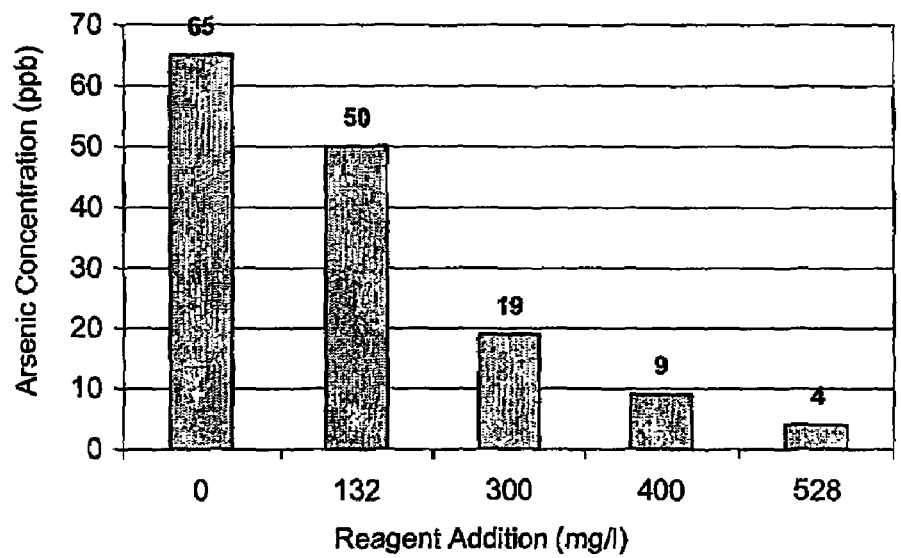
FIG. 3 shows arsenic removal from Fernley well water using the ex-situ method.
Figure 4:
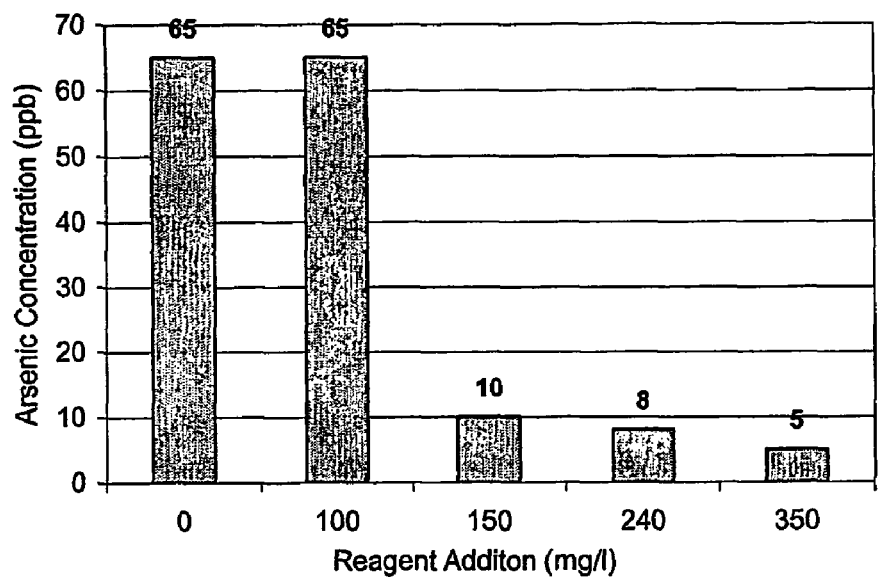
FIG. 4 shows arsenic removal from Fernley well water using the in-situ method.
Figure 5:
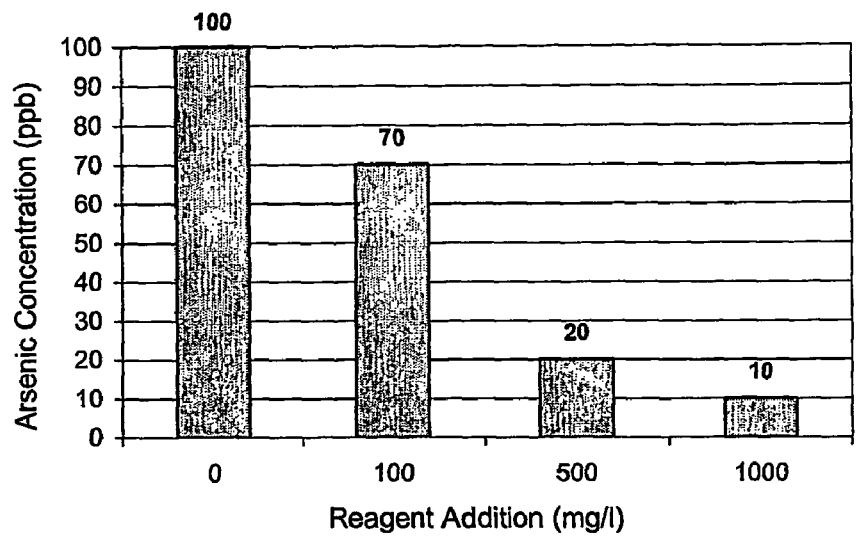
FIG. 5 shows arsenic removal from synthetic arsenite solution using the ex-situ method.
Figure 6:
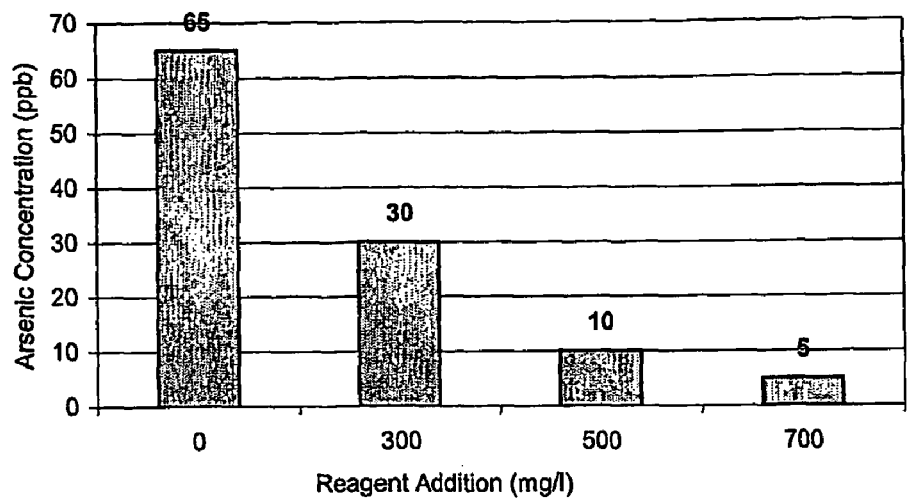
FIG. 6 shows arsenic removal from synthetic arsenite solution using the in-situ method.

Arsenic removal as a function of hydroxide-gel addition is given in FIG. 2. As can be seen, hydroxide precipitate prepared using lime and MgO are effective in removing arsenic from water. However, hydroxide-gel prepared using lime is more effective than that of the precipitate prepared using MgO.

EXAMPLE E DE-coated Hydroxides (La+Fe) Tests

In these tests, lanthanum and iron hydroxides were precipitated at a ratio of 1:4 weight percent, respectively. Precipitation of hydroxides was conducted using lime at pH 9-10. Precipitates were filtered using the DE-pre coat filtration method. The DE-precoat filter bed was prepared by mixing 4 grams DE in 500 cc of water and filtering the mixture through a filter device. The thickness of the bed was around 1 inch thick. DE-coated hydroxide precipitate was used in the arsenic removal test. Results are given in Table 12.

TABLE 12

Conditions: 500 cc Fernley Drinking Water; pH = 8.36

| Amount, gms | Initial As, ppb | Conditioning Time, min | Final As, ppb | % Removed |
|---|---|---|---|---|
| 3 gms, DE-coated hydroxides (La + Fe) | 93 | 5 | 8 | 91.3 |

TABLE 12-continued

Conditions: 500 cc Fernley Drinking Water; pH = 8.36

| Amount, gms | Initial As, ppb | Conditioning Time, min | Final As, ppb | % Removed |
|---|---|---|---|---|
| 3 gms DE-coated hydroxides (La + Fe) | 93 | 10 | 6 | 93.5 |
| 3 gms DE-coated Hydroxide (Lanthanum Hydroxide only) | 93 | 5 | 12 | 87.0 |
| 3 gms DE-coated Hydroxide (Lanthanum Hydroxide only) | 93 | 10 | 10 | 89.2 |

These experiments showed that DE-coated lanthanum iron hydroxides as well as DE-coated lanthanum hydroxide are efficient in removing arsenic from drinking water.

EXAMPLE F

Tests with Chlorinated Drinking Water Using Different Hydroxides

Chlorinated drinking water was collected from the Fernley Water Treatment Facility. Arsenic removal tests were conducted using different hydroxides prepared in the laboratory. Experimental results are given in Table 13. In this case hydroxide-gels were prepared from commercial grade lanthanum carbonate by mixing with ferric chloride and precipitated with lime.

TABLE 13

Conditions: 500 cc of Fernley water; pH = 6.7

| Amount of hydroxide-gels added, gm | Initial As, ppb | Conditioning time, min. | Final As Concentration, ppb | % Removed |
|---|---|---|---|---|
| 1 gm hydroxides (from lanthanum hydroxides) | 80 | 5 | 5 | 93.7 |
| 1 gm (Iron + lanthanum hydroxides) | 80 | 10 | <5 | ~100 |
| .25 gm aluminum hydroxide | 80 | 5 | 11 | 86.2 |
| .25 gm aluminum hydroxide | 80 | 10 | <5 | ~100 |
| 1 gm hydroxide (aluminum hydroxide + lanthanum hydroxide) | 80 | 5 | 11 | |
| 1 gm hydroxide (aluminum hydroxide + lanthanum hydroxide) | 80 | 10 | <5 | 100 |
| 1 gm hydroxide ppt. (aluminum hydroxide + iron hydroxide) | 80 | 5 | 10 | |
| 1 gm hydroxide ppt. (aluminum hydroxide) | 80 | 10 | <5 | 100 |

Tests conducted with different hydroxides (prepared from their respective salts) were effective in removing arsenic from drinking water using DE-precoat filters. Arsenic removal from chlorinated water is much easier as compared to non-chlorinated water.

EXAMPLE G

Evaluation of Different Pre-coat Filter Materials for As Removal

In the following tests, hydroxide-gels of iron and lanthanum were used to coagulate arsenic from water. One gram of the hydroxide-gel sludge prepared by combining ferric chloride and lanthanum carbonate was added and mixed in 500 cc of Fernley water at a pH range of 8.3-8.5. Results are given in Table 14.

TABLE 14

Effect of Different Pre-coat Filtering Materials in As Removal after Coagulation

| Type of Pre-coat Materials | Amount of Hydroxide/gm | Conditioning time, min. | Initial As, ppb | Final As, ppb |
|---|---|---|---|---|
| DE-bed | 1 | 5 | 100 | 9 |
| DE-bed | 1 | 10 | 100 | 4 |
| Cellulose-bed | 1 | 5 | 100 | 29 |
| Cellulose-bed | 1 | 10 | 100 | 26 |
| Perlite-bed | 1 | 5 | 100 | 13 |
| Perlite-bed | 1 | 10 | 100 | 2 |

DE - Eagle-Picher Diatomaceous Earth
Cellulose - Eagle-Picher, PB-40M cellulose
Perlite - Eagle-Picher, CP-1400 Perlite DE was much more effective than either perlite or cellulose. Cellulose was not as effective as DE.

EXAMPLE H

Evaluation of DE-coated Hydroxide-gel Mixed at Different Ratios

In another experiment, hydroxide-gels of lanthanum and ferric were filtered through a previously prepared DE bed. The DE containing hydroxide-gel was mixed with Fernley water for different times. After mixing, the water was filtered through a pre-coat DE filter bed. Results are given in Table 15.

TABLE 15

DE Containing Hydroxide-gel for Arsenic Removal

| Initial As Concentration, ppb | Amount of Precipitate [DE + La(OH)$_3$] added to solution, gm | pH of Solution | As Concentration in Filtrate after 5 min. & 10 min., ppb |
|---|---|---|---|
| 86 | 3 | 8.45 | 9, 8 |

| Initial As Concentration, ppb | Amount of Precipitate [DE + La(OH)$_3$ + Fe(OH)$_3$] (La:Fe) (1:4) added to solution, gm | pH of Solution | As Concentration in Filtrate after 5 min. & 10 min., ppb |
|---|---|---|---|
| 86 | 3 | 8.31 | 7, 6 |

| Initial As Concentration, ppb | Amount of Precipitate [DE + La(OH)$_3$ + Fe(OH)$_3$] (La:Fe) (1:2) added to solution, gm | pH of Solution | As Concentration in Filtrate after 5 min. & 10 min., ppb |
|---|---|---|---|
| 86 | 3 | 8.45 | 5, 4 |

Results given in Table 15 showed that DE-containing hydroxide-gels are powerful coagulants for removing arsenic from drinking water. It is seen that a DE-precoat filter is uniquely suitable for DE-containing hydroxide-gels.

EXAMPLE I

Preparation of DE Adsorbent

DE-coated hydroxide gels can be prepared in-situ and ex-situ. In the ex-situ method, a precipitating composition is contacted with DE and the pH is adjusted to form a DE-coated hydroxide-gel. The pH may be adjusted at the same time the DE-coated hydroxide-gel is contacted with arsenic- or heavy metal-containing water. The precipitating composition is preferably a solution of lanthanum salt and an iron salt. In the in-situ method, metal salts are contacted with DE and the composition is aged (usually between 24-96 hours). After aging, the DE and metal salts are contacted with arsenic- or heavy metal-containing water and the pH is adjusted to form DE-coated hydroxide-gels. As shown herein, the in-situ method of preparation generally allows for a lower amount of precipitating composition to be used to provide the desired level of arsenic or heavy metal removal.

For Examples J through L, the metal salt hydroxy-gel was coated onto DE using two different techniques, i.e., ex-situ method and in-situ method. The hydroxide-gel was prepared by the combination of two salts (lanthanum chloride and ferric chloride) at an appropriate condition, as described herein. In the in-situ preparation, DE was mixed with lanthanum chloride and ferric chloride. After 24 hours aging time, the mixture was then stored for later use. The metal salt hydroxide-gel formation was conducted in-situ by mixing the prepared material with influent and adjusting the pH to 7.5 with NaOH. In the ex-situ preparation, DE was first mixed with lanthanum chloride and ferric chloride, and the pH was adjusted to 7.5 with the addition of NaOH so that metal salt hydroxide-gel formation takes place. This material can be applied directly to water.

EXAMPLE J

Lab-scale Test for Arsenic Removal

Two kinds of arsenic water samples were used in the lab test, i.e., a synthetic sample prepared with sodium arsenite and an arsenic-containing groundwater sample obtained from Fernley, Nev. The results are shown in FIGS. 3 through 6.

The results showed that both the arsenate and arsenite species can be effectively removed from synthetic solutions and drinking water using hydroxy coated DE. However, the material prepared by the in-situ method was more effective than the material prepared by the ex-situ method. For the synthetic water sample, an effluent of 10 ppb or less can be achieved by applying 1000 mg/L of reagent with the ex-situ method, or 500 mg/L with the in-situ method. For the Fernley groundwater sample, the required reagent dosage was 400 mg/L and 150 mg/L, respectively.

EXAMPLE K

Pilot Plant Test for Arsenic Removal

Figure 7:
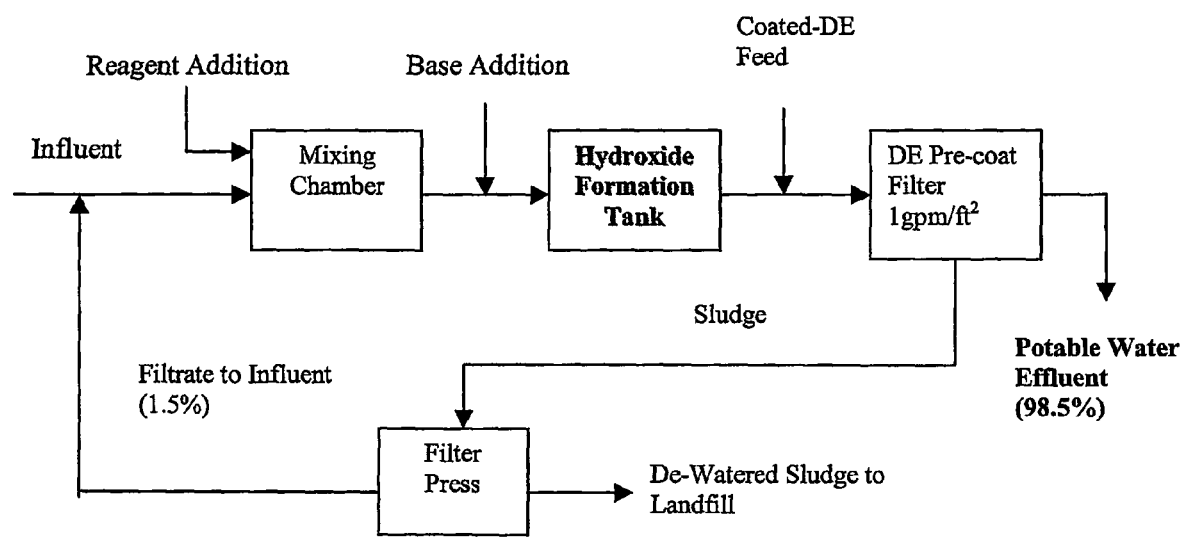
FIG. 7 shows a flow diagram of one embodiment of the ex-situ process.
Figure 8:
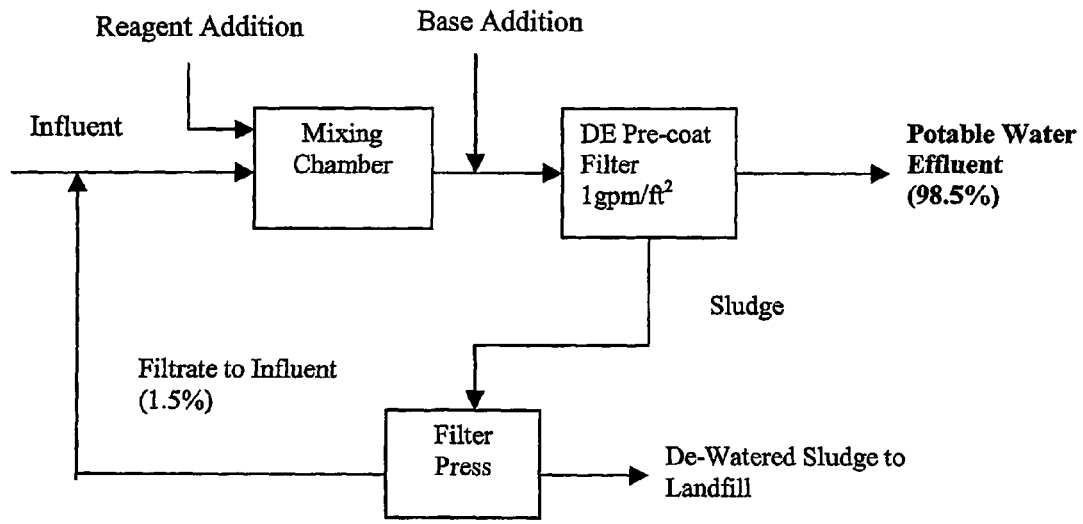
FIG. 8 shows a flow diagram of one embodiment of the in-situ process.

Continuous flow pilot plant tests were also conducted to treat the arsenic-containing underground water. The generalized schematic of the process flow sheet is given in FIGS. 7 and 8. During the test, the retention time, reagent addition, pH, and the mode of reagent addition were varied. The pilot plant was operated at a flow rate of 12-15 gallons/min. Samples of influent and effluent were taken after a steady-state was reached.

Figure 9:
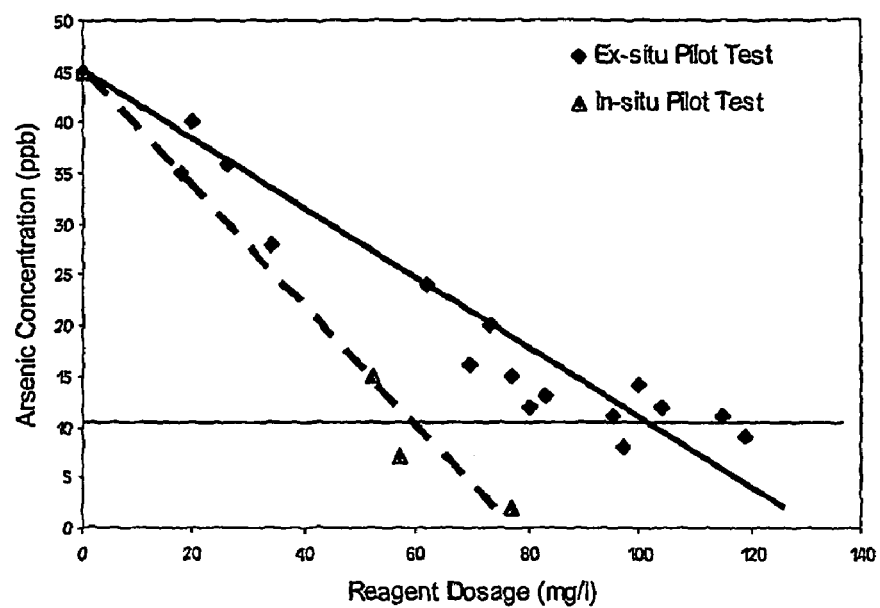
FIG. 9 shows arsenic removal from Fernley ground water.

Arsenic concentration in the effluent for different amounts of reagent additions is given in FIG. 9. Approximately 100 mg/l of the reagent (prepared by the ex-situ method) is required to achieve an arsenic level of 10 ppb. Arsenic concentration in the effluent as a function of reagent addition prepared by the in-situ method is also shown in FIG. 9. As can be seen, reagent addition of 60 mg/l is required to accomplish the arsenic level of 10 ppb. The results show that the in-situ method is more efficient in adsorbing arsenic than the ex-situ method. This conclusion is consistent with the lab-scale test.

EXAMPLE L

Heavy Metal Adsorption by Coated DE Adsorbents

Lab-scale heavy metals adsorption tests were conducted using both in-situ and ex-situ coated DE methods. In these tests, synthetic solutions containing Cu(II), Pb(II), and Cr(VI) were treated with coated DE adsorbents. During the tests different contacting time was used. The results are shown in Table 16 and 17. Both methods showed a high removal rate for copper and lead, while in-situ method was much more effective in treating chromium-containing water.

TABLE 16

Heavy metals removal by coated DE adsorbent (Ex-situ method)

| Contact Time (min.) | Initial Concentration | 5 min | | 15 min | | 60 min | |
|---|---|---|---|---|---|---|---|
| Metal | (ppb) | (ppb) | (%) | (ppb) | (%) | (ppb) | (%) |
| Cu (II) | 9,677 | 59.4 | 99.39% | 100.9 | 98.96% | 141.6 | 98.54% |
| Pb (II) | 10,000 | 263 | 97.37% | 254 | 97.46% | 381 | 96.19% |
| Cr (VI) | 9,280 | 8260 | 10.99% | 8250 | 11.10% | 8270 | 10.88% |

TABLE 17

Heavy metals removal by coated DE adsorbent (In-situ method)

| Contact Time (min.) | Initial Concentration | 5 min | | 15 min | | 60 min | |
|---|---|---|---|---|---|---|---|
| Metal | (ppb) | (ppb) | (%) | (ppb) | (%) | (ppb) | (%) |
| Cu (II) | 8,064 | 3.8 | 99.95% | 11.4 | 99.86% | 11.7 | 99.85% |
| Pb (II) | 8,333 | 2.8 | 99.97% | 20.6 | 99.75% | 24.4 | 99.71% |
| Cr (VI) | 7,733 | 63.2 | 99.18% | 46.2 | 99.40% | 336 | 95.65% |

All references cited herein are hereby incorporated by reference to the extent not inconsistent with the disclosure herewith. Although this description contains many specificities, these should not be construed as limiting the scope of the invention, but merely providing illustrations of some of the preferred embodiments of the invention. For example, metal salt hydroxide gels other than those specifically illustrated may be used. All numerical ranges given herein include all individual values and intermediate ranges therein.

REFERENCES

Ahmann, D., Krumholz, L. R., Hemond, H. F., Lovley, D. R., and Morel, F. M. M., 1997, "Microbial Mobilization of Arsenic from Sediments of the Abejona Watershed," Environ. Sci. Technol., 31:2923-2930.

Davis, S. and Misra M., "Transport Model for the Adsorption of Oxyanions of Selenium (IV) and Arsenic (V) from Water Onto Lanthanum and Alumina Oxides", Journal of Colloid & Interface Science, 188, 1997, p. 340-350.

EPA, 2002, EPA Implements Standard of 10 ppb—http://www.epa.gov/safewater/arsenic.html Gupta, S. K. and Chen, K. Y., "Arsenic Removal by Adsorption," 50(3) Journal of Water Pollution Control Federation, 493, March 1978.

Harper, T. R. and Kingham, N. W. "Removal of Arsenic from Wastewater using Chemical Precipitation Methods," 64(3) Water Environment Research 200-203, 1992.

Merrill, D. T., et al., "Field Evaluation of Arsenic and Selenium Removal by Iron Coprecipitation," 6(2) Environmental Progress 82-90, 1987.

Misra, M. and Nayak, D., U.S. Pat. No. 5,603,838.

Misra, M., et al., U.S. Pat. No. 6,197,201.

Misra, M., Raichur, A. M. and Keltner, K., "Adsorption and Separation of Arsenic from Process Water Using LS™ (Lanthanum-Silica Compound)," Proceedings of the Randol Gold Forum '97, 1997, pp. 203-206.

Misra, M. and Adutwum, K. O., "Adsorption of Oxyanions of Selenium Onto Lanthanum Oxide and Alumina," Minor Elements 2000, Published by SME, February 2000, pp. 345-353.

Misra, M., Nanor, J., and Bucknam, C. H., "Enhanced Precipitation and Stabilization of Arsenic from Gold Cyanidation Process," Minor Elements 2000, Published by SME, February 2000, pp. 141-148.

Nanor, J. and Misra, M., "Removal and Stabilization of Arsenic," Randol Gold Forum, 1999, pg. 191-196.

National Academy of Sciences, "Arsenic-Medical and Biological Effects of Environmental Pollutants," U.S. Government Printing Office, Washington, D.C., 1977. National Research Council, Arsenic in Drinking Water, Washington D.C., National Academy Press, 1999.

Rawat, A. and Misra, M., "Adsorption of the Oxyanions of Arsenic onto Lanthanum Oxide," EPD Congress, The Minerals, Metals and Materials Society (TMS), Warrendale, Pa., 1998, pp. 14-23.

Wasay, S. A., et al. "Removal of Arsenite and Arsenate Ions from Aqueous Solution by Basic Yttrium Carbonate," 30(5) Wat. Res. 1143-1148, 1996.

We claim:

1. A method of removing arsenic from arsenic-containing water comprising: coating diatomaceous earth with one or more metal salt hydroxide-gels to form diatomaceous earth pre-coated hydroxide-gels, wherein said metal salt is selected from the group consisting of lanthanum salt, ferric salt, and aluminum salt; contacting said arsenic-containing water with said diatomaceous earth pre-coated hydroxide-gels; and filtering said water through a diatomaceous earth filter bed or a diatomaceous earth-precoat filter.

2. The method of claim 1, wherein said said filtering uses a filter screen or septum made of water-compatible material coated with diatomaceous earth.

3. The method of claim 2, wherein said water-compatible material is polyethylene, polypropylene or stainless steel.

4. The method of claim 1, wherein said filter is a diatomaceous earth filter bed.

5. The method of claim 1, wherein said metal salt hydroxide-gel is formed by adjusting the pH of a solution containing metal salts so that a metal salt hydroxide-gel is formed.

6. The method of claim 1, wherein diatomaceous earth pre-coated hydroxide-gels are contacted with said arsenic-containing water at a pH from about 2 to about 14.

7. The method of claim 1 wherein said contacting step is performed using a member of the group consisting of: mechanical mixing, ultrasonic mixing, mixing in-line using an atomizer, mixing in-line using venturi and mixing using metering pumps.

8. The method of claims 1, wherein said metal salt hydroxide-gel is formed from at least one member of the group consisting of: lanthanum chloride, lanthanum nitrate, lanthanum carbonate, ferric chloride, ferric sulfate, aluminum chloride, aluminum nitrate, aluminum sulfate, and sodium aluminate.

9. The method of claim 8, wherein said metal salt comprises more than one metal salt.

10. The method of claim 1, wherein said arsenic-containing water contains arsenic at a concentration of about 10 ppb to 100 ppm.

11. The method of claim 10, wherein said arsenic-containing water contains one or more members selected from the group consisting of: arsenite and arsenate.

12. The method of claim 10, wherein said arsenic-containing water comprises one or more members of the group selected from: raw water, well water, drinking water, and process water.

13. The method of claim 1, wherein said precoated hydroxide-gels are contacted with said arsenic-containing water for a time of between about 1 minute to about 6 minutes at a pH between about 3 and about 12.

14. The method of claim 1, wherein said metal salt hydroxide-gel comprises lanthanum and ferric hydroxides.

15. The method of claim 1, wherein metal salt hydroxide-gels comprise weight ratios of between about 1:1 and 1:10 of lanthanum: ferric hydroxides.

16. The method of claim 1, wherein said metal salt hydroxide-gel consists essentially of lanthanum hydroxide.

17. The method of claim 1, wherein said metal salt hydroxide-gel comprises a lanthanum hydroxide.

* * * * *

UNITED STATES PATENT AND TRADEMARK OFFICE
CERTIFICATE OF CORRECTION

| | | |
|---|---|---|
| PATENT NO. | : 7,445,718 B2 | Page 1 of 1 |
| APPLICATION NO. | : 10/510526 | |
| DATED | : November 4, 2008 | |
| INVENTOR(S) | : Manoranjan Misra and Peter Lenz | |

It is certified that error appears in the above-identified patent and that said Letters Patent is hereby corrected as shown below:

Title page, item (73) Assignees, Line 2

Please replace "Systems" with --System--.

Signed and Sealed this

Seventeenth Day of February, 2009

JOHN DOLL
*Acting Director of the United States Patent and Trademark Office*